Sept. 8, 1925.  1,552,636
G. L. MORRIS
HONEY EXTRACTOR
Filed Feb. 7, 1921
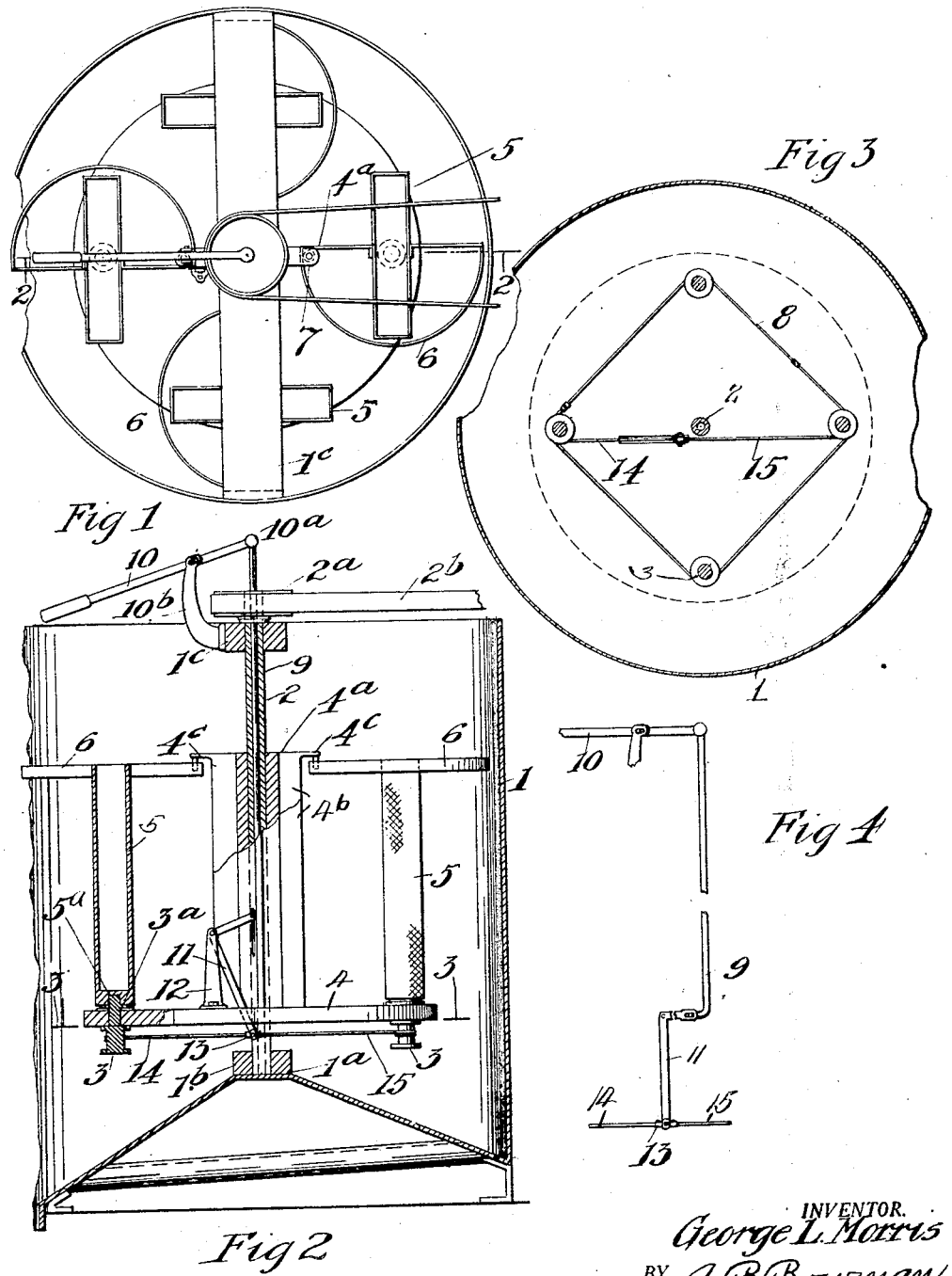
INVENTOR.
George L. Morris
BY A. B. Bowman
ATTORNEY.

Patented Sept. 8, 1925.

1,552,636

UNITED STATES PATENT OFFICE.

GEORGE L. MORRIS, OF BONSAL, CALIFORNIA.

HONEY EXTRACTOR.

Application filed February 7, 1921. Serial No. 442,972.

*To all whom it may concern:*

Be it known that I, GEORGE L. MORRIS, a citizen of the United States, residing at Bonsal, in the county of San Diego and State of California, have invented a certain new and useful Honey Extractor, of which the following is a specification.

My invention relates to honey extractors for extracting honey from the honey combs, more particularly of the centrifugal type with reversible honey comb receptacles and the objects of my invention are: First and primarily, improvements over my application for Letters Patent for honey extractors, filed in the United States Patent Office October 4, 1920, Serial No. 414,613 and the objects of said improvements are: First, to provide a means for reversing the honey comb receptacles several times if desired without stopping the revolution of the extractor; second, to provide means for reversing the honey comb receptacles, operative independent of the revolving means; third, to provide a novel means of supporting the honey comb receptacle on their revolving base whereby they may be readily removed from the base, and fourth to provide a means for reversing the honey comb receptacles which is very simple and economical of construction, durable, easy to operate, easy to install, efficient in its action and which will not readily deteriorate or get out of order.

With these and other objects in view as will appear hereinafter, my invention consists of certain novel features of construction, combination and arrangement of parts and portions as will be hereinafter described in detail, and particularly set forth in the appended claims, reference being had to the accompanying drawings and to the characters of reference thereon which form a part of this application in which:

Figure 1 is a top or plan view of my honey extractor; Fig. 2 is a sectional view through 2—2 of Fig. 1; Fig. 3 is a sectional view through 3—3 of Fig. 2 and Fig. 4 is a side elevational view of the honey comb reversing mechanism.

Similar characters of reference refer to similar parts and portions throughout the several views of the drawings.

The main receptacle 1, main shaft 2, sheave members 3, disc member 4, honey comb receptacles 5, guide members 6, rollers 7, cable 8, rod 9, lever 10, bell crank 11, support 12, cable support 13, and cables 14 and 15 constitute the principal parts and portions of my honey extractor.

The casing 1 is preferably a metallic receptacle with the bottom raised at $1^a$ and provided with a journal member $1^b$, positioned thereon which serves as a bearing for the lower end of the shaft 2, which is revolubly mounted therein, and its other end extends upwardly and is journaled in a cross bar $1^c$ near its upper end. Secured on the upper end of this main shaft 2 which is a hollow shaft is a sheave $2^a$ upon which is mounted a belt $2^b$ which is adapted to connect with any driving mechanism.

It will here be noted, however, that this shaft 2 may be turned by a crank thus providing for the manual operation of the extractor if desired.

Secured to the shaft 2 is the disc member 4 which is provided with an upwardly extending hub portion $4^a$, which hub portion is provided with four outwardly extending webs $4^b$ which are provided with outwardly extending arms $4^c$ at their upper ends. Revolubly mounted near the outer edge of the disc member 4 are the sheave members 3. The upper ends of these sheave members 3 are provided with tapered square ends $3^a$, and the honey comb receptacles 5 are provided centrally in their lower sides with tapered, square shaped sockets $5^a$ conforming to the portion $3^a$, thus providing means for supporting the member 5. Each of these receptacles 5 is provided with perforate sides and is provided with a semi-circular guide member 6 secured to its upper end on the opposite sides, and these guide members 6 are engaged by rollers 7 which are revolubly mounted upon the members $4^c$ in alignment with the upper side of the receptacle 5. The sheave members 3 are connected together by means of an endless cable 8 which is wound around each of the sheaves 3 so that each of the sheaves 3 may be revolved simultaneously in either direction so that the sheaves together with the honey comb receptacles 5 are revolved simultaneously with the movement of the cable 8 in either direction. This cable 8 is shifted by means of the cables 14 and 15, one of which is secured to the cable 8 and extends around one of the sheaves 3 and the other is secured to the cable 8 and extends around the opposite sheave in the opposite direction thus providing for shifting the cable 8 in either direction and the cables 14 and 15 are pivotally connected to the one end of the bell crank 11 by means of the cable support 13 which is pivoted on the one arm of the bell crank 11 and said bell crank is pivoted above the disc and the downwardly extending arm of the bell crank is mounted in a slot in said disc to permit the movement of the arm. The bell crank is mounted upon a support 12 secured on the upper surface of the disc 4, and its other end extends inwardly and connects with the extended end of the rod 9 which is reciprocally mounted in the shaft 2 and its lower end provided with a right angle turn which extends out through a longitudinal slot in the shaft 2 and hub 4$^a$ of the disc 4, the upper end of this rod 9 is provided with a ball joint adapted for a socket 10$^a$ of the lever 10, which lever 10 is pivotally and shiftably mounted on an arm 10$^b$, secured on the member 1$^c$, thus providing means for reciprocating the rod 9. It will be noted that the arm 10$^b$ is provided with a slot to permit slight longitudinal movement of the lever 10.

Though I have shown and described a particular construction, combination and arrangement of parts and portions, I do not wish to be limited to this particular construction, combination and arrangement, but desire to include in the purview of my invention the construction, combination and arrangement substantially as set forth in the appended claims.

It is obvious that with this construction there is provided a honey extractor in which a plurality of honey comb receptacles are revolved for centrifugal separation of the honey from the comb, that there is provided a means for revolving the receptacles and for reversing them, which is operative without stopping the revolution of their supports and independent of such revolution, that with the movement of the over-hanging end of the lever 10, the rod 9 will be reciprocated, operating the bell crank 11, which will shift the cables 14 and 15 endwise, which in turn will shift the cable 8, revolving the members 3 and thereby the honey comb receptacles. That the whole shifting mechanism revolves with the disc excepting the lever 10, in which the upper end of the rod 9 revolves by means of the ball and socket joint.

Having thus described my invention, what I claim as new, and desire to secure by Letters Patent, is:

1. A honey extractor, including a main receptacle, a hollow shaft revolubly mounted in said receptacle, a support secured on said shaft in said receptacle, a plurality of honeycomb receptacles revolubly mounted on said support, means for guiding the upper ends of said honeycomb receptacles, means for revolving said honeycomb receptacles a one-half revolution including a sheave secured to each of said receptacles, a cable connecting said sheaves, a bell crank mounted on said support with one arm connected to said cable, and means connected to the other arm of said bell crank for operating said bell crank.

2. A honey extractor, including a main receptacle, a hollow shaft revolubly mounted in said receptacle, a support secured on said shaft in said receptacle, a plurality of honeycomb receptacles revolubly mounted on said support, means for guiding the upper ends of said honeycomb receptacles, means for revolving said honeycomb receptacles a one-half revolution including a sheave secured to each of said receptacles, a cable connecting said sheaves, a bell crank pivotally mounted on and above said support with its one arm extending downwardly and connected with said cable, said hollow shaft being provided intermediate its ends above said support with a longitudinal slot, and a rod reciprocally mounted in said hollow shaft pivotally connected at its lower end with the other arm of said bell crank at the slotted portion of said shaft.

3. A honey extractor including a main receptacle, a hollow shaft revolubly mounted in said receptacle, a disc member secured on said shaft in said receptacle, a plurality of perforate honey comb receptacles, revolubly mounted on said disc, means for guiding the upper ends of said honey comb receptacles, means for revolving said honey comb receptacles a one-half revolution comprising, a sheave secured to each of said receptacles, a cable connecting said sheaves, means revoluble with said disc for shifting said cable a certain pre-determined distance; comprising cables with their ends secured to said cable and extending around two of said sheaves in opposite directions, a bell crank positioned on the upper side of said disc, with one end pivotally connected to said cables and means reciprocally mounted in said shaft, pivotally connected to the other arm of said bell crank.

4. A honey extractor, including a main receptacle, a hollow shaft revolubly mounted in said receptacle, a supporting member secured on said shaft in said receptacle provided at its lower side with an extended portion and at its upper end with extended arms, a plurality of perforate honeycomb receptacles revolubly mounted on the lower extended portion, semicircular guide means secured to the upper ends of each of said honeycomb receptacles, and means secured to the arms on the upper end of said support extending downwardly adapted to engage the inner sides of said semicircular guide means for supporting said receptacles.

In testimony whereof, I have hereunto set my hand at San Diego, California, this 26th day of January, 1921.

GEORGE L. MORRIS.